US012542406B2

(12) United States Patent
Kishi et al.

(10) Patent No.: US 12,542,406 B2
(45) Date of Patent: Feb. 3, 2026

(54) COAXIAL ELECTRICAL CONNECTOR

(71) Applicant: Hirose Electric Co., Ltd., Kanagawa (JP)

(72) Inventors: Shuto Kishi, Kanagawa (JP); Tsubasa Kaneko, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 309 days.

(21) Appl. No.: 18/134,316

(22) Filed: Apr. 13, 2023

(65) Prior Publication Data

US 2023/0335958 A1 Oct. 19, 2023

(30) Foreign Application Priority Data

Apr. 14, 2022 (JP) ................................ 2022-066792

(51) Int. Cl.
*H01R 24/50* (2011.01)
*H01R 103/00* (2006.01)

(52) U.S. Cl.
CPC ......... *H01R 24/50* (2013.01); *H01R 2103/00* (2013.01)

(58) Field of Classification Search
CPC .. H01R 24/50; H01R 2103/00; H01R 13/533; H01R 24/44
See application file for complete search history.

(56) References Cited

U.S. PATENT DOCUMENTS

| | | | | |
|---|---|---|---|---|
| 4,650,271 A * | 3/1987 | Forney, Jr. | ............. | H01R 24/44 439/578 |
| 5,217,391 A * | 6/1993 | Fisher, Jr. | .............. | H01R 24/44 439/578 |
| 2018/0048101 A1* | 2/2018 | Maruyama | ............. | H05K 3/308 |
| 2020/0091665 A1* | 3/2020 | Maki | ..................... | H01R 13/629 |
| 2020/0203881 A1* | 6/2020 | Marzano | ................ | H01G 4/232 |
| 2021/0249827 A1* | 8/2021 | Haga | ...................... | H01R 24/40 |
| 2023/0335958 A1* | 10/2023 | Kishi | ................... | H01R 13/533 |
| 2024/0010901 A1* | 1/2024 | Yu | ............................ | C09K 5/14 |

FOREIGN PATENT DOCUMENTS

JP 2015-149184 A 8/2015

* cited by examiner

*Primary Examiner* — Abdullah A Riyami
*Assistant Examiner* — Nelson R. Burgos-Guntin
(74) *Attorney, Agent, or Firm* — Procopio, Cory, Hargreaves & Savitch LLP

(57) ABSTRACT

A center conductor 20 has an abutment portion 22A placed in surface contact with a dielectric body 30 from below, the dielectric body 30 has a first dielectric body 31 and a second dielectric body 32 provided in contact with the first dielectric body 31 from below, the first dielectric body 31 has a lower dielectric dissipation factor than the dielectric dissipation factor of the second dielectric body 32, the second dielectric body 32 has a higher deflection temperature under load than the first dielectric body 31, and the surface area of the top face placed in surface contact with the bottom face of the first dielectric body 31 is larger than the surface area of the top face of the abutment portion 22A placed in surface contact with the bottom face of the second dielectric body 32.

9 Claims, 4 Drawing Sheets

[FIG. 3(A)]
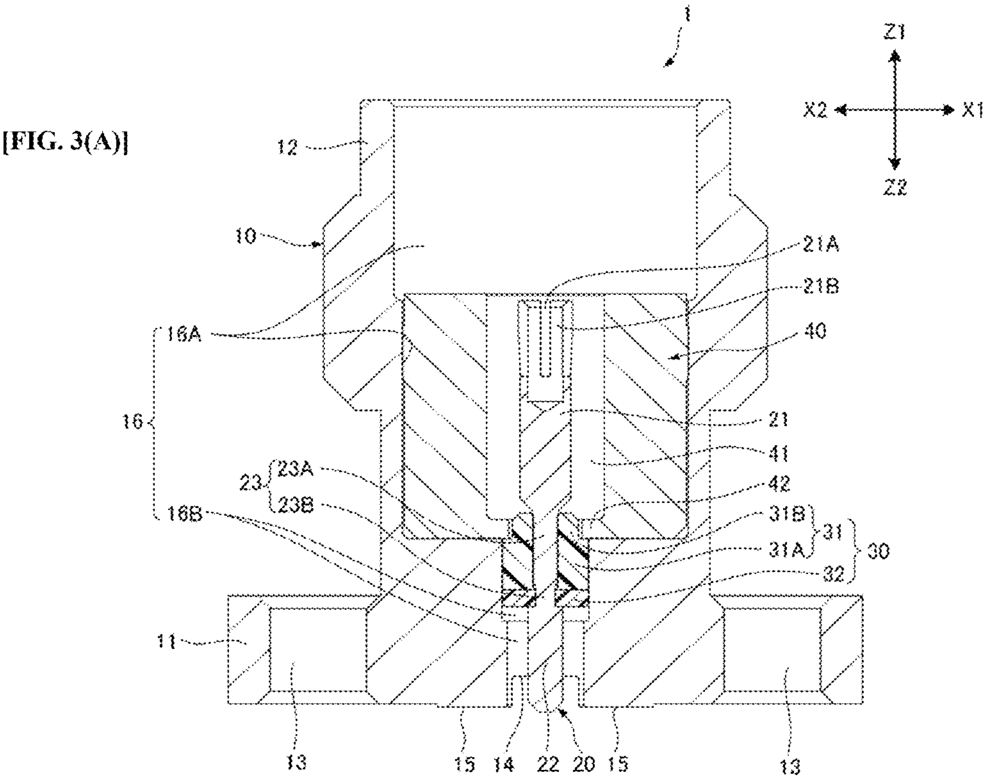
[FIG. 3(B)]
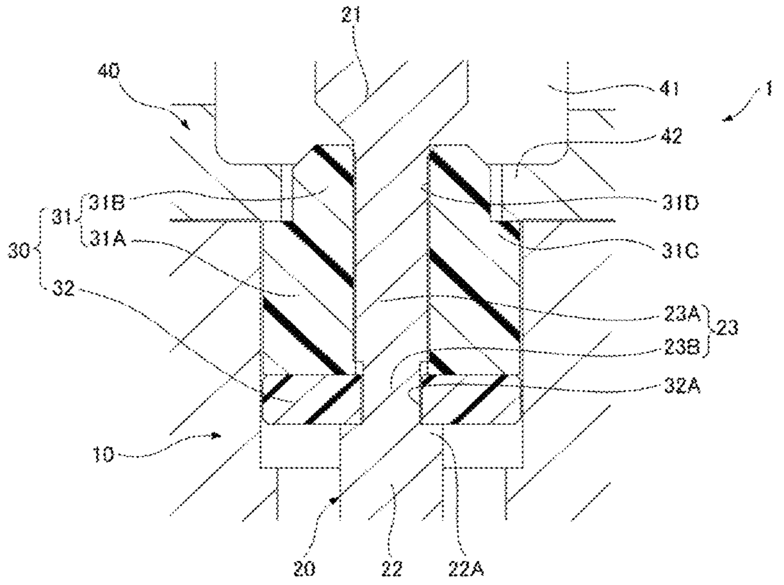

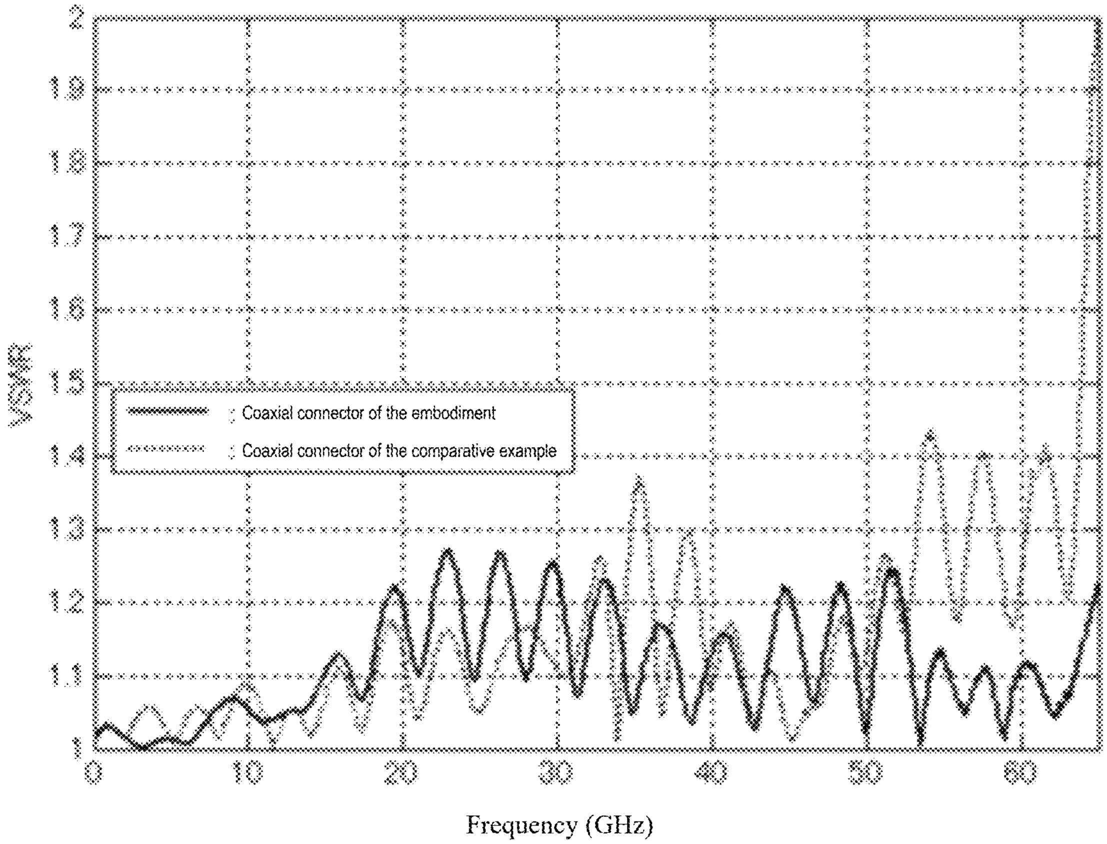
[FIG. 4]

COAXIAL ELECTRICAL CONNECTOR

CROSS-REFERENCE TO RELATED APPLICATIONS

This application claims priority to Japanese Patent Application No. 2022-066792, filed Apr. 14, 2022, the contents of which are incorporated herein by reference in its entirety for all purposes.

BACKGROUND

Technical Field

The present invention relates to a coaxial electrical connector connected to a circuit board.

Background Art

For example, a coaxial connector, in which a dielectric body (insulating member), a center conductor, and an annular fitting are provided within an interior space of an outer conductor, has been disclosed in Patent Document 1 as this type of coaxial electrical connector. The interior space of the outer conductor is formed to pass through the outer conductor in an up-down direction perpendicular to a mounting face of a circuit board. The dielectric body, which is made of plastic, is disposed within said interior space at a location proximal to the bottom end, with the vertically extending center conductor inserted into and held in place by a retaining hole in said dielectric body and with the decoupling of the dielectric body and the center conductor prevented by an annular fitting attached from below.

The center conductor, which has a beveled portion that protrudes radially outwardly from said center conductor in the section inserted and retained in the retaining hole of the dielectric body, is held in place by the dielectric body while the beveled protrusion abuts a stepped portion (indentation) formed in the inner peripheral surface of the retaining hole from below. When the coaxial connector is mounted to a circuit board, the center conductor, whose bottom end portion slightly protrudes from the bottom face of the outer conductor, is adapted to come into contact with circuits on the mounting face of the circuit board under contact pressure from above. At such time, the center conductor is constantly subject to a reaction force directed upwardly from the mounting face of the circuit board. However, due to the fact that the stepped portion of the dielectric body counteracts the above-mentioned reaction force by supporting the beveled protrusion of the center conductor from above, contact pressure develops between the center conductor and the circuits of the circuit board.

RELATED ART DOCUMENTS

Patent Documents

[Patent Document 1] Japanese Published Patent Application No. 2015-149184.

SUMMARY

Problems to be Solved

According to Patent Document 1, the dielectric body is configured as a single piece of 1 type of plastic material. Although the specific type of the plastic material making up this dielectric body is not clearly identified in Patent Document 1, in general, PTFE (polytetrafluoroethylene), which possesses superior radio-frequency characteristics and, in addition, makes it easy to obtain appropriate resilience, is employed in many cases. However, PTFE's deflection temperature under load is not sufficiently high. Consequently, if the environment of use of the coaxial connector becomes hotter, the dielectric body tends to undergo plastic deformation, at which time the above-mentioned reaction force can no longer be counteracted and the center conductor ends up being displaced upwardly from its normal position, which makes it difficult to bring the center conductor and the circuits of the circuit board into contact under appropriate contact pressure.

In view of the aforesaid circumstances, it is an object of the present invention to provide a coaxial electrical connector which, along with ensuring adequate radio-frequency characteristics, makes it easy to maintain the center conductor in its normal position even if temperature changes occur in the environment of use of the coaxial connector.

Technical Solution

The inventive coaxial electrical connector, which is a coaxial electrical connector connected to a circuit board, has a metallic outer conductor, in which an interior space having an axis extending in an up-down direction perpendicular to a mounting face of a circuit board is formed to pass therethrough in the up-down direction, a dielectric body held in place by the outer conductor within the interior space, and a metallic center conductor held in place by the dielectric body within the interior space and having contact with the mounting face via the bottom end portion.

Such a coaxial electrical connector, in the present invention, is characterized by the fact that the center conductor has an abutment portion placed in surface contact with the dielectric body from below, the dielectric body has a first dielectric body and a second dielectric body provided in contact with the first dielectric body from below, the first dielectric body has a lower dielectric dissipation factor than the dielectric dissipation factor of the second dielectric body, the second dielectric body has a higher deflection temperature under load than the first dielectric body, and the surface area of its top face placed in surface contact with the bottom face of the first dielectric body is larger than the surface area of the top face of the abutment portion placed in surface contact with the bottom face of the second dielectric body.

In the present invention, the dielectric body, which has a first dielectric body and a second dielectric body, counteracts the upwardly directed force (reaction force) received from the circuit board by the bottom end portion of the center conductor due to the fact that the second dielectric body supports the abutment portion of the center conductor from above. Compared to the first dielectric body, the second dielectric body has a higher deflection temperature under load and, consequently, is less likely to undergo plastic deformation even if the environment of use of the coaxial electrical connector becomes hotter. Therefore, because of being supported by the second dielectric body from above, the center conductor does not run the risk of moving upwardly from its normal position and the above-mentioned reaction force can be adequately counteracted by the supporting force of the second dielectric body. As a result, it becomes easier to maintain the contact portion of the center conductor and the circuit board in a state of contact under appropriate contact pressure.

In addition, since in the second dielectric body the surface area of its top face placed in surface contact with the bottom face of the first dielectric body is larger than the surface area of the top face of the abutment portion placed in surface contact with the bottom face of the second dielectric body, the above-mentioned reaction force transferred to the bottom face of the first dielectric body through the medium of the second dielectric body is distributed over a large area. Therefore, even if the environment of use of the coaxial electrical connector becomes hotter, the action of the above-mentioned reaction force on the first dielectric body is not concentrated within a small area. Therefore, the first dielectric body is less likely to undergo plastic deformation, as a result of which it is easier to maintain the center conductor in its normal position. In addition, since the dielectric body includes not only the second dielectric body but also the first dielectric body, which has a lower dielectric dissipation factor than the second dielectric body, the radio-frequency characteristics of the coaxial connector are enhanced compared to when the dielectric body is made up of the second dielectric body alone.

In the present invention, the first dielectric body may be formed of a larger size in the up-down direction than the second dielectric body. In this manner, since the first dielectric body, which has a lower dielectric dissipation factor than the second dielectric body, has a larger size in the up-down direction than the second dielectric body, the radio-frequency characteristics of the coaxial connector can be further improved.

In the present invention, the first dielectric body may be made of polytetrafluoroethylene and the second dielectric body may be made of polyetherimide.

Technical Effect

The present invention can provide a coaxial electrical connector which, along with ensuring adequate radio-frequency characteristics, makes it easy to maintain the center conductor in its normal position even if temperature changes occur in the environment of use of the coaxial connector.

BRIEF DESCRIPTION OF THE DRAWINGS

FIG. 3 (A) is a cross-sectional view of the coaxial electrical connector of FIG. 1, showing a cross section taken in a plane containing the axis of the coaxial electrical connector, and FIG. 3 (B) is a cross-sectional view showing an enlarged portion of FIG. 3 (A).

FIG. 4 illustrates a graph showing the frequency characteristics of the coaxial electrical connector of FIG. 1 in comparison with the frequency characteristics of a coaxial electrical connector according to a comparative example.

DETAILED DESCRIPTION

An embodiment of the present invention will be described below with reference to the accompanying drawings.

Figure 1:
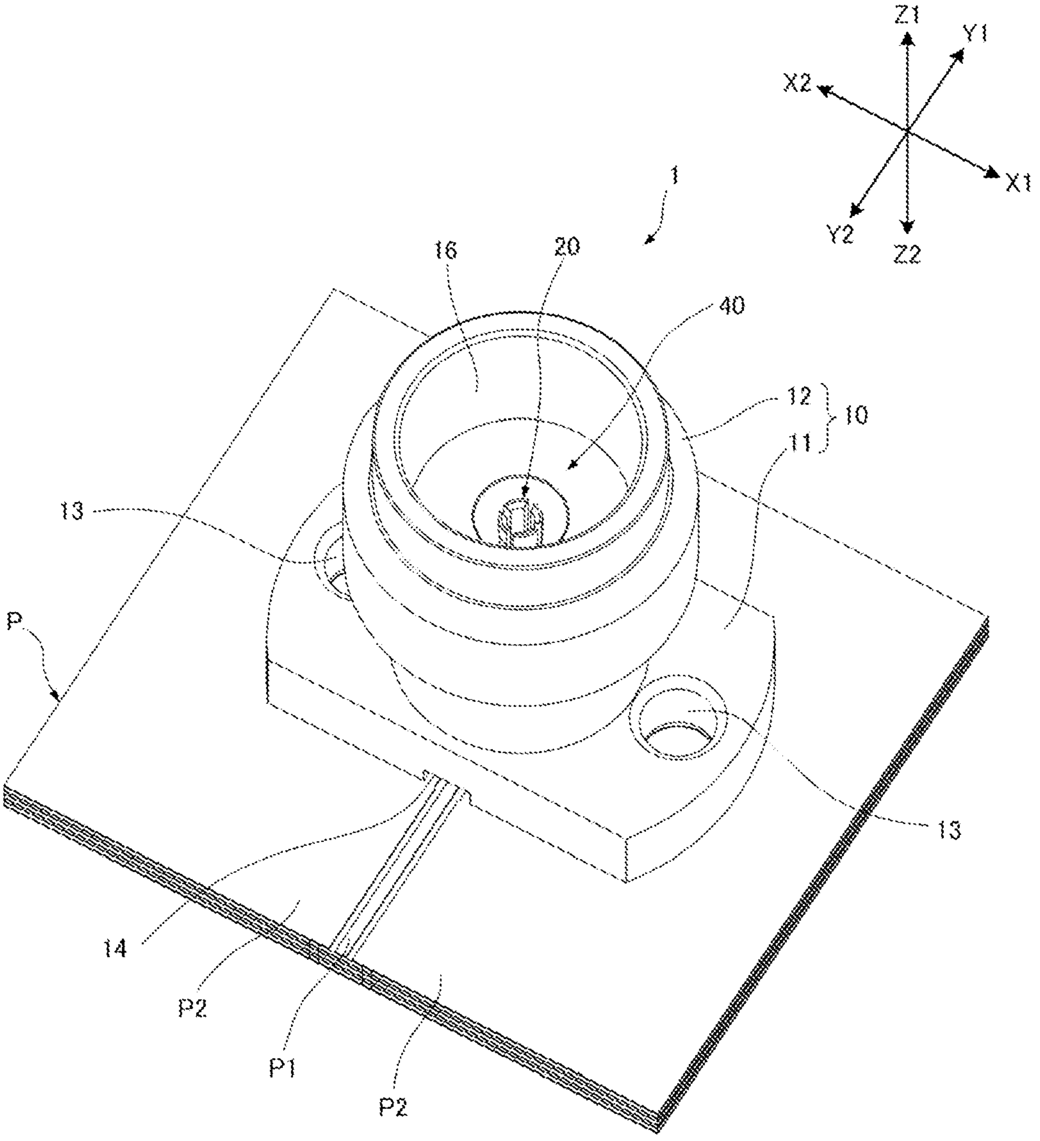
FIG. 1 illustrates a perspective view showing a coaxial electrical connector according to an embodiment of the present invention along with a circuit board, as viewed obliquely from above.
Figure 2:
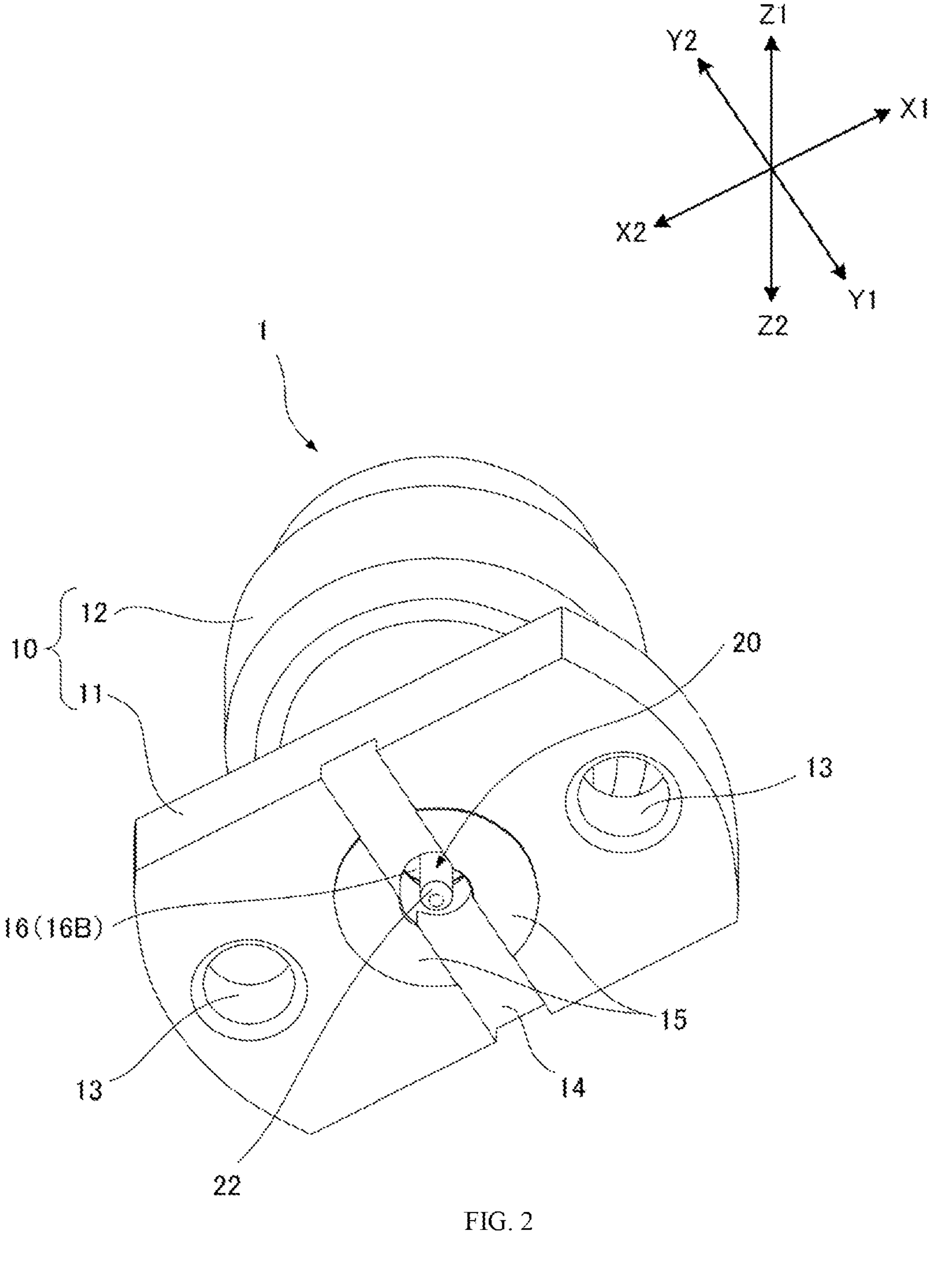
FIG. 2 illustrates a perspective view showing the coaxial electrical connector of FIG. 1 as viewed obliquely from below.

FIG. 1 is a perspective view showing a coaxial electrical connector 1 (referred to as "coaxial connector 1" below) according to an embodiment of the present invention along with a circuit board P, shown as viewed obliquely from above. FIG. 1 shows only a portion of the circuit board P, which is actually formed to extend farther both in the X-axis direction and in the Y-axis direction. FIG. 2 is perspective view showing the coaxial connector 1 as viewed obliquely from below. FIG. 3 (A) is a cross-sectional view of the coaxial connector 1 showing a cross section taken in a plane containing the axis of the coaxial connector 1. FIG. 3 (B) is a cross-sectional view showing an enlarged portion of FIG. 3 (A).

The circuit board P, to which the coaxial connector 1 is mounted, is a so-called "test port" used to test performance of electronic components such as IC chips (not shown). In addition, the coaxial connector 1 is a so-called "test port connector," which is mounted to the circuit board P and is connected to measurement equipment (not shown) used to measure the electrical characteristics of electronic components through the medium of a counterpart coaxial connector (not shown) and a coaxial cable (not shown). As shown in FIG. 1, a signal pattern P1 extending in the Y-axis direction on the mounting face, and a ground pattern P2 sandwiching the signal pattern P1 and extending in the X-axis direction on both sides, are formed on the mounting face of the circuit board P. The electronic components to be performance-tested are mounted in the vicinity of the end of the signal pattern P1 on the Y2 side, and the coaxial connector 1 is mounted in the vicinity of the end of the signal pattern P1 on the Y1 side (test port). A counterpart coaxial connector (not shown) connected to a coaxial cable (not shown) is matingly connected to the coaxial connector 1 from above.

The coaxial connector 1, which has an axis extending in the up-down direction (Z-axis direction) perpendicular to the mounting face of the circuit board P, has a symmetrical geometry both in the X-axis direction and in the Y-axis direction. As shown in FIG. 3, the coaxial connector 1 has a metallic outer conductor 10, a metallic center conductor 20 disposed concentrically with the hereinafter described interior space 16 of the outer conductor 10 within said interior space 16, a dielectric body 30 made of plastic, and a metallic support 40. In addition, the dielectric body 30 has a first dielectric body 31 and a second dielectric body 32 molded from materials that are different from each other.

The outer conductor 10 has a plate-shaped base portion 11, which extends parallel to the circuit board P, and a cylindrical barrel portion 12, which extends upwardly from the top face of the base portion 11. As shown in FIG. 1, the base portion 11 has a plate-like configuration whose longitudinal direction is the connector width direction (X-axis direction) perpendicular to the Y-axis direction, in which the signal pattern P1 extends. A mounting hole portion 13, i.e., a screw hole passing through the base portion 11 in the up-down direction, is provided at each of the opposite ends sandwiching the barrel portion 12 in the connector width direction. In the present embodiment, the coaxial connector 1 is attached to the circuit board P by threadedly engaging screw members (not shown) with the mounting hole portions 13 and screw holes (not shown) provided in the circuit board P in alignment with said mounting hole portions.

As shown in FIG. 2, a bottom groove portion 14, which extends in the transverse direction of the base portion 11 (Y-axis direction) midway along the connector width direction (X-axis direction), is formed in the bottom of the base portion 11. As shown in FIG. 3 (A), the bottom groove portion 14, as viewed in the Y-axis direction, is sunk from the bottom of the base portion 11 in a quadrangular configuration, and, as shown in FIG. 2, passes through the base portion 11 over the entire extent of the base portion 11 in the Y-axis direction. The groove width dimensions (dimensions in the X-axis direction) of the bottom groove portion 14 are larger than the width dimensions (dimensions in the X-axis direction) of the signal pattern P1 (see FIG. 1) and the outside diameter of the center conductor 20 (see FIG. 1 and FIG. 3 (A)). Further, as shown in FIG. 2, while the opposite side edges of the bottom groove portion 14 (edge portions extending in the Y-axis direction) have a rectilinear configuration throughout their extent in the Y-axis direction with the exception of the central portion, in the central area, they have an arcuate configuration concentric with the center conductor 20 and the hereinafter described interior space 16. Therefore, the groove width dimensions of the bottom groove portion 14 in the range in which the side edges are of an arcuate configuration are larger than the groove width dimensions in the range in which the side edges are of a rectilinear configuration.

In addition, as shown in FIG. 2, protrusions 15 that protrude slightly beyond other regions are formed in a region spanning the middle on the bottom of the base portion 11 (see also FIG. 3 (A)). The protrusions 15 are formed to extend in a substantially semicircular configuration on the opposite sides of the bottom groove portion 14 in the connector width direction (X-axis direction). The protrusions 15 form part of a circle that is concentric with the center conductor 20 when viewed from below. In the present embodiment, when the coaxial connector 1 is screw-attached to the circuit board P, the bottom of the protrusions 15 is pressed against the top face of the ground pattern P2 on the circuit board P. Therefore, providing the protrusions 15 on the bottom of the base portion 11 in this manner makes it easier to ensure an adequate state of electrical communication by bringing the outer conductor 10 and the ground pattern P2 reliably into surface contact.

The barrel portion 12 is of a cylindrical configuration that has an axial centerline extending in the up-down direction and rises upwardly from the top face of the base portion 11. A vertically intermediate part of the barrel portion 12 has a larger diameter than other parts.

An interior space 16, which has an axial centerline extending in the up-down direction and, as shown in FIG. 3 (A), passes through the base portion 11 and the barrel portion 12 in the up-down direction, is formed in the outer conductor 10. The interior space 16 has a large-diameter space 16A and a small-diameter space 16B formed downwardly of the large-diameter space 16A.

The large-diameter space 16A is a cylindrical space formed within a vertical range spanning from the location of the top end of the barrel portion 12 to a location proximal to its bottom end. As shown in FIG. 3 (A), the top space of the large-diameter space 16A has a slightly larger diameter than the bottom space. As shown in FIG. 3 (A), the hereinafter described connection portion 21 of the center conductor 20 and the support 40 are accommodated in the bottom space. The top space and the hereinafter described interior space 41 of the support 40 are spaces intended to receive a counterpart coaxial connector when a counterpart coaxial connector (not shown) is matingly connected to the coaxial connector 1 from above. When the counterpart coaxial connector is matingly connected, the inner peripheral surface of the outer conductor 10 that forms the top space of the large-diameter space 16A is brought into contact with the outer peripheral surface of the counterpart outer conductor (not shown) of the counterpart coaxial connector, thereby making electrical communication possible.

The small-diameter space 16B, which has a smaller diameter than the large-diameter space 16A, is formed within a vertical range spanning from the location of the bottom end of the large-diameter space 16A to the location of the top end of the bottom groove portion 14 of the base portion 11. As shown in FIG. 3 (A), the top space of the small-diameter space 16B has a slightly larger diameter than the bottom space.

The center conductor 20, which has a pin-like configuration extending in the up-down direction, is provided at a location concentric with the interior space 16 when viewed in the up-down direction. As shown in FIG. 3 (A), the center conductor 20 has a connection portion 21, which is provided in the top portion and to which the counterpart center conductor (not shown) of the counterpart coaxial connector is connected, a contact portion 22, which is provided in the bottom portion and is capable of contacting the signal pattern P1 (see FIG. 1) on the circuit board P, and a coupling portion 23, which is provided between the connection portion 21 and the contact portion 22 and couples the two portions.

As shown in FIG. 3 (A), the connection portion 21 is accommodated within the large-diameter space 16A of the outer conductor 10, more specifically, within the hereinafter described interior space 41 of the support 40 disposed within the large-diameter space 16A. The top portion of the connection portion 21, which is cylindrical in shape and has slits 21A formed at a plurality of locations in the circumferential direction, has connector pieces 21B formed between adjacent slits 21A. The counterpart center conductor (not shown) of the counterpart coaxial connector is adapted to be inserted from above into the space enclosed by the plurality of connector pieces 21B. At such time, electrical communication with the counterpart center conductor is made possible because the plurality of connector pieces 21B are resiliently deformed as a result of being pushed apart radially outwardly from the connection portion 21 by the counterpart center conductor and make contact with the outer peripheral surface of the counterpart center conductor under contact pressure.

The coupling portion 23 has a cylindrical configuration of a smaller diameter than the connection portion 21 and the contact portion 22, and, as shown in FIG. 3 (A), is accommodated in the interior space 16 while being inserted into the dielectric body 30. Specifically, the coupling portion 23 extends over a range that spans both the large-diameter space 16A and the small-diameter space 16B in the up-down direction. As shown in FIGS. 3 (A) and 3 (B), the coupling portion 23 has a first retained portion 23A, which extends over a range spanning from the location of the top end to a location proximal to the bottom end, and a second retained portion 23B, which extends over a range spanning from a location proximal to the bottom end to the location of the bottom end. The first dielectric body 31 retains the first retained portion 23A by its outer peripheral surface. The second dielectric body 32 retains the second retained portion 23B, which has a slightly smaller diameter than the first retained portion 23A, by its outer peripheral surface.

As shown in FIG. 3 (A), the contact portion 22, which has a cylindrical configuration of a smaller diameter than the connection portion 21, extends over a range that is substantially equal to the base portion 11 in the up-down direction. A bottom end section of the contact portion 22 protrudes into the bottom groove portion 14, with the other sections accommodated within the small-diameter space 16B. In addition, the distal end portion (bottom end portion) of the bottom end section of the contact portion 22 has its distal end face (bottom end face) located slightly downwardly of the bottom face of the protrusions 15. Due to the fact that the bottom end portion of the contact portion 22 protrudes slightly beyond the bottom face of the protrusions 15 in this manner, once mounted to the circuit board P, the coaxial connector 1 is brought into reliable contact with the signal pattern P1 via this bottom end portion.

In addition, the contact portion 22 has a larger diameter than the coupling portion 23 and, as shown in FIG. 3 (B), an abutment portion 22A located radially outwardly from the second retained portion 23B of the coupling portion 23 is formed in the top portion of the contact portion 22. The abutment portion 22A abuts the bottom face of the second dielectric body 32 by coming into surface contact therewith from below. Put otherwise, the second dielectric body 32 supports the abutment portion 22A from above.

The first dielectric body 31 is made, for example, of polytetrafluoroethylene (PTFE), and is fabricated by molding in the shape of a cylinder. In the present embodiment, polytetrafluoroethylene, i.e., the material of the first dielectric body 31, has a dielectric dissipation factor of about 0.0002 and a deflection temperature under load of about 55° C. As shown in FIG. 3 (A) and FIG. 3 (B), the first dielectric body 31, which has a larger size in the up-down direction than the second dielectric body 32, has a large-diameter portion 31A, which makes up a bottom portion, and a small-diameter portion 31B, which makes up a top portion.

The large-diameter portion 31A, which is formed with an outside diameter substantially equal to the inside diameter of the top space of the small-diameter space 16B of the outer conductor 10, is press-fitted and accommodated within this top space. As shown in FIG. 3 (B), a shoulder portion 31C located radially outwardly from the small-diameter portion 31B is formed in the top portion of the large-diameter portion 31A. The top face of the shoulder portion 31C is located at the same height as the bottom (lower interior wall surface) of the large-diameter space 16A of the interior space 16. The small-diameter portion 31B, which protrudes upwardly from the bottom of the large-diameter space 16A, is accommodated in the bottom portion of the hereinafter described interior space 41 of the support 40. In addition, the top end portion of the small-diameter portion 31B protrudes upwardly from the hereinafter described supporting portion 42 of the support 40.

As shown in FIG. 3 (B), the first dielectric body 31 has a first through-hole portion 31D that passes through the first dielectric body 31 in the up-down direction. The first through-hole portion 31D is formed with an inside diameter substantially equal to the outside diameter of the first retained portion 23A of the center conductor 20.

In addition, an incision (not shown) is formed in the first dielectric body 31 over its entire vertical extent at a single location in the circumferential direction. This incision is formed radially from the location of the outer peripheral surface to the location of the inner peripheral surface (peripheral wall surface forming the first through-hole portion 31D) of the first dielectric body 31. In other words, the first dielectric body 31 becomes discontinuous at the location of the above-mentioned incision in the circumferential direction.

The second dielectric body 32 is made, for example, of polyetherimide (PEI), and is fabricated by molding in the shape of an annular plate. In the present embodiment, polyetherimide, i.e., the material of the second dielectric body 32, has a higher dielectric dissipation factor (about 0.0013) than the dielectric dissipation factor of the first dielectric body 31 and a higher deflection temperature under load (about 197-200° C.) than the deflection temperature under load of the first dielectric body 31. The second dielectric body 32 is separate from the first dielectric body 31 and is provided downwardly from the first dielectric body 31, and the top face of the second dielectric body 32 is placed in contact with the bottom face of the first dielectric body 31. The second dielectric body 32 is formed with the same outside diameter as the outside diameter of the first dielectric body 31. In brief, the second dielectric body 32 is formed with an outside diameter substantially equal to the inside diameter of the top space of the small-diameter space 16B of the outer conductor 10 and is press-fitted and accommodated in this top space. The second dielectric body 32 has a second through-hole portion 32A passing through said second dielectric body 32 in the up-down direction. The second through-hole portion 32A is formed with an inside diameter that is slightly smaller than the first through-hole portion 31D of the first dielectric body 31 and, in addition, the inside diameter is substantially equal to the outside diameter of the second retained portion 23B of the center conductor 20.

Further, in the same manner as in the previously discussed first dielectric body 31, an incision (not shown) is formed in the second dielectric body 32 over its entire vertical extent at a single location in the circumferential direction. This incision is formed radially from the location of the outer peripheral surface to the location of the inner peripheral surface (peripheral wall surface forming the second through-hole portion 32A) of the second dielectric body 32. In other words, the second dielectric body 32 becomes discontinuous at the location of the above-mentioned incision in the circumferential direction.

The support 40, which has a cylindrical configuration, is accommodated in the bottom portion of the large-diameter space 16A of the outer conductor 10. The support 40 has a section of a slightly larger diameter than other parts in the top portion and this section is press-fittingly retained by the outer conductor 10. An interior space 41, which is coaxial with the interior space 16 of the outer conductor 10 and is passing through the support 40, is formed in the support 40. A supporting portion 42, which protrudes radially inwardly towards the interior space 41, is provided in the bottom portion of the support 40. As shown in FIG. 3 (B), the supporting portion 42, which is formed over the entire circumferential extent of the interior space 41, is placed in surface contact with the shoulder portion 31C of the first dielectric body 31 from above and supports the shoulder portion 31C.

The coaxial connector 1 is manufactured in the accordance with the following procedure. First, the first dielectric body 31 is attached to the first retained portion 23A by inserting the center conductor 20, at the bottom end side, i.e., the side of the contact portion 22, into the first through-hole portion 31D of the first dielectric body 31. Although in the present embodiment the first through-hole portion 31D has a smaller diameter than the contact portion 22, there is an incision formed in the first dielectric body 31, and when the contact portion 22 is inserted into the first through-hole portion 31D, the first dielectric body 31 undergoes resilient deformation so to open up at the location of the incision in the circumferential direction, thereby permitting insertion of the contact portion 22. Further, when the first dielectric body 31 passes the area of the contact portion 22 and reaches the area of the first retained portion 23A, the first dielectric body 31 undergoes deformation so as to close the location of the incision, i.e., reduce the amount of resilient deformation. As a result, the inner peripheral surface of the first dielectric body 31 comes into surface contact with the outer peripheral surface of the first retained portion 23A, and the first dielectric body 31 holds the first retained portion 23A in place. In this condition, the incision in the first dielectric body 31 may be either completely closed or slightly open.

Next, the second dielectric body 32 is attached to the second retained portion 23B by inserting the center conductor 20, at its bottom end side, i.e., the side of the contact portion 22, into the second through-hole portion 32A of the second dielectric body 32. Although in the present embodiment the second through-hole portion 32A has a smaller diameter than the contact portion 22, in the same manner as during the previously discussed attachment of the first dielectric body 31, the second dielectric body 32 undergoes resilient deformation so to open up at the location of the incision in the circumferential direction, thereby permitting insertion of the contact portion 22. In addition, when the inner peripheral surface of the second dielectric body 32 has been placed in surface contact with the outer peripheral surface of the second retained portion 23B, i.e., when the second dielectric body 32 holds the second retained portion 23B in place, the incision in the second dielectric body 32 may be either completely closed or slightly open in a manner similar to the first dielectric body 31.

As shown in FIG. 3 (B), when the second dielectric body 32 has been attached to the second retained portion 23B, the top face of the second dielectric body 32 is in surface contact with the bottom face of the first dielectric body 31, and the top face of the abutment portion 22A of the center conductor 20 is in surface contact with the bottom face of the second dielectric body 32. In the present embodiment, the surface area of the top face of the second dielectric body 32 placed in surface contact with the bottom face of the first dielectric body 31 is larger than the surface area of the top face of the abutment portion 22A of the center conductor 20 placed in surface contact with the bottom face of the second dielectric body 32.

Next, the center conductor 20, to which the dielectric body 30, i.e., the first dielectric body 31 and second dielectric body 32, has been attached, is accommodated in the interior space 16 of the outer conductor 10 from above. Specifically, the dielectric body 30 is press-fitted into the small-diameter space 16B of the interior space 16 from above. As a result, the contact portion 22 and the coupling portion 23 of the center conductor 20, along with the dielectric body 30, are accommodated in the small-diameter space 16B. At such time, as shown in FIG. 3 (A), the bottom end side section of the contact portion 22 protrudes downwardly from the small-diameter space 16B and is positioned within the bottom groove portion 14 of the outer conductor 10, while the small-diameter portion 31B of the first dielectric body 31 and the top end side section of the coupling portion 23 retained by said small-diameter portion 31B protrude upwardly from the small-diameter space 26 B and are positioned within the large-diameter space 16A. As shown in FIG. 3 (B), the top face of the shoulder portion 31C of the first dielectric body 31 is positioned at the same height as the bottom face (lower interior wall surface) of the large-diameter space 16A of the interior space 16. In addition, as shown in FIG. 3 (A), the connection portion 21 of the center conductor 20 is accommodated within the large-diameter space 16A.

Next, the support 40 is accommodated in the large-diameter space 16A of the outer conductor 10 by press-fitting from above. The support 40 is press-fitted until its bottom face abuts the bottom of the large-diameter space 16A, as a result of which the supporting portion 42 is placed in surface contact with the shoulder portion 31C of the first dielectric body 31 from above and thus supports the shoulder portion 31C from above. Since the supporting portion 42 supports the shoulder portion 31C from above in this manner, a condition is maintained in which the first dielectric body 31 supports the second dielectric body 32 from above with its bottom face and, furthermore, the bottom face of the second dielectric body 32 supports the abutment portion 22A of the center conductor 20 from above. The attachment of the support 40 to the outer conductor 10 in this manner completes the assembly of the coaxial connector 1.

The practical use of the coaxial connector 1 is described below. In the present embodiment, the coaxial connector 1 is used by mounting it to a test port on a circuit board P (test board), to which an electronic component to be performance-tested (an IC chip, etc.) is mounted. First, the coaxial connector 1 is disposed on the circuit board P such that the mounting hole portions 13 of the outer conductor 10 are aligned with the screw holes (not shown) provided in the circuit board P. The coaxial connector 1 of the present embodiment has a symmetrical geometry both in the X-axis direction and in the Y-axis direction, and can therefore be disposed on the circuit board P in a simple manner without worrying about orientation in these two directions. The coaxial connector 1 disposed on the circuit board P in this manner is attached to the circuit board P by threadedly engaging screw members (not shown) from above with the mounting hole portions 13 and the screw holes in the circuit board P.

When the coaxial connector 1 is attached to the circuit board P, the bottom end face of the contact portion 22 of the center conductor 20 is pressed from above against the signal pattern P1 on the circuit board P while the bottom end faces of the protrusions 15 of the outer conductor 10 are pressed from above against the ground pattern P2 on the circuit board P. As a result, the center conductor 20 and the signal pattern P1 as well as the outer conductor 10 and the ground pattern P2 are brought into contact with each other under contact pressure, thereby making electrical communication possible.

In addition, a counterpart coaxial connector (not shown) attached to one end of a coaxial cable (not shown) is matingly connected to the coaxial connector 1 from above. As a result, a counterpart center conductor (not shown) of the counterpart coaxial connector is connected to the connection portion 21 of the center conductor 20 of the coaxial connector 1, and a counterpart outer conductor (not shown) of the counterpart coaxial connector is connected to the barrel portion 12 of the outer conductor 10 of the coaxial connector 1. In addition, the other end of the coaxial cable is connected to the measurement equipment (not shown) used to measure electrical characteristics. When the performance of electronic components is tested, a voltage is applied to the electronic component mounted to the test board and its electrical characteristics are measured by the measurement equipment.

Once the contact portion 22 of the center conductor 20 is brought into contact with the signal pattern P1 on the circuit board P under contact pressure from above, the contact portion 22 becomes subject to a force (reaction force) directed upwardly from the signal pattern P1 on a constant basis. As discussed previously, in the present embodiment the supporting portion 42 supports the shoulder portion 31C of the first dielectric body 31 from above, the first dielectric body 31 supports the second dielectric body 32 from above with its bottom face and, furthermore, the bottom face of the second dielectric body 32 supports the abutment portion 22A of the center conductor 20 from above. Since the above-mentioned reaction force from the signal pattern P1 is counteracted by those supporting forces applied from above, an adequate state of contact under contact pressure is maintained between the center conductor 20 and the signal pattern P1.

The above-described performance testing of electronic components (IC chips, etc.) is conducted by assuming an environment of use with a wide temperature range (e.g., −55° C. to 105° C.). Therefore, in the coaxial connector 1, which is used for performance testing, it is also desirable to prevent the state of contact with the circuit board P from being influenced by temperature changes as much as possible in the above-mentioned temperature range. In the present embodiment, the dielectric body 30 includes two members made of different materials, i.e., the first dielectric body 31 and the second dielectric body 32. The second dielectric body 32, which directly supports the abutment portion 22A of the center conductor 20, is made of polyetherimide and has a higher deflection temperature under load than the first dielectric body 31 made of polytetrafluoroethylene. Therefore, the second dielectric body 32 is less likely to undergo plastic deformation even if the thermal environment becomes hotter, and, consequently, the center conductor 20 subject to the reaction force from the circuit board P does not run the risk of moving upwardly from its normal position and the above-mentioned reaction force can be adequately counteracted by the supporting force of the second dielectric body 32. As a result, it becomes easier to maintain the contact portion 22 of the center conductor 20 and the signal pattern P1 of the circuit board P in a state of contact under appropriate contact pressure.

In addition, since in the present embodiment, in the second dielectric body 32, the surface area of its top face placed in surface contact with the bottom face of the first dielectric body 31 is larger than the surface area of the top face of the abutment portion 22A of the center conductor 20 placed in surface contact with the bottom face of the second dielectric body 32, the above-mentioned reaction force transferred to the bottom face of the first dielectric body 31 through the second dielectric body 32 is distributed over a large area. Therefore, even if the thermal environment becomes hotter, the action of the above-mentioned reaction force on the first dielectric body 31 is not concentrated in a small area and, consequently, the first dielectric body 31 is less likely to undergo plastic deformation, as a result of which it becomes easier to maintain the center conductor 20 in its normal position.

Further, in the present embodiment, due to the fact that the dielectric body 30 includes not only the second dielectric body 32, but also the first dielectric body 31, which has a lower dielectric dissipation factor than the second dielectric body 32, the radio-frequency characteristics of the coaxial connector 1 are enhanced compared to when the dielectric body 30 is made up of the second dielectric body 32 alone. In addition, in the present embodiment, the radio-frequency characteristics of the coaxial connector 1 can be further improved because the first dielectric body 31, which has a lower dielectric dissipation factor than the second dielectric body 32, is formed with a larger size in the up-down direction than the second dielectric body 32.

FIG. 4 is a graph that shows test results obtained by measuring the frequency characteristics (radio-frequency characteristics) of the coaxial connector 1 of the present embodiment and those of a coaxial connector according to a comparative example. This graph shows the frequency characteristics of each coaxial connector by plotting frequency (GHz) along the horizontal axis and the voltage to standing wave ratio, i.e., VSWR, along the vertical axis. In this graph, the frequency characteristics of the coaxial connector 1 of the present embodiment are shown with a solid line, and the frequency characteristics of the coaxial connector of the comparative example are shown with a dotted line. The above-mentioned testing was performed by mounting coaxial connectors of the same kind at each end of a signal pattern formed on a circuit board and measuring the voltage to standing wave ratio obtained by transmitting signals in the 0-65 GHz frequency band. The closer the value of the voltage to standing wave ratio was to 1, the better the frequency characteristics were.

Further, in the coaxial connector of the comparative example, the dielectric body holding the center conductor in place was made of polytetrafluoroethylene and configured as a single piece, in which respect it was different from the dielectric body of the present embodiment configured of two members, i.e., the first dielectric body 31 made of polytetrafluoroethylene and the second dielectric body 32 made of polyetherimide. It should be noted that, other than the dielectric body, the components of the comparative example's coaxial connector were identical to those of the coaxial connector of the present embodiment.

As shown in FIG. 4, unlike the coaxial connector of the comparative example, in which the value of the voltage to standing wave ratio became considerably greater than "1" as the frequency of the transmitted signal increased, in the coaxial connector 1 of the present embodiment, even when the frequency of the transmitted signal increased, the degree to which the value of the voltage to standing wave ratio exceeded "1" was kept smaller than in the comparative example, i.e., the vicinity to "1" was maintained. In short, it can be seen that the frequency characteristics of the coaxial connector 1 of the present embodiment were superior to those of the coaxial connector of the comparative example. In addition, as will be appreciated from FIG. 4, the difference in the voltage to standing wave ratio between the present embodiment and the comparative example became larger as frequency increased, and it can be said that the present embodiment had particularly superior radio-frequency characteristics.

Although the present embodiment describes an example in which the coaxial connector 1 is used as a so-called test port connector, its uses are not limited thereto, and it may, for instance, be mounted to circuit boards provided in electronic products.

DESCRIPTION OF THE REFERENCE NUMERALS

1 Coaxial connector
10 Outer conductor
16 Interior space
20 Center conductor
22A Abutment portion
30 Dielectric body
31 First dielectric body
32 Second dielectric body
40 Support
P Circuit board

The invention claimed is:

1. A coaxial electrical connector connected to a circuit board, said coaxial electrical connector comprising:

a metallic outer conductor, in which an interior space having an axis extending in an up-down direction perpendicular to a mounting face of the circuit board is formed to pass therethrough in the up-down direction;

a dielectric body held in place by the metallic outer conductor within the interior space; and a metallic center conductor held in place by the dielectric body within the interior space and having contact with the mounting face via a bottom end portion, wherein the metallic center conductor comprises:

an abutment portion placed in surface contact with the dielectric body from below, the dielectric body comprising a first dielectric body and a second dielectric body provided in a direct contact with the first dielectric body from below, the first dielectric body having a lower dielectric dissipation factor than a dielectric dissipation factor of the second dielectric body, the second dielectric body having a higher deflection temperature under load than the first dielectric body, and wherein a surface area of a first top face of the abutment portion placed in surface contact with a bottom face of the first dielectric body is larger than the surface area of a second top face of the abutment portion placed in surface contact with the bottom face of the second dielectric body.

2. The coaxial electrical connector according to claim 1, wherein the first dielectric body is formed with a larger size in the up-down direction than the second dielectric body.

3. The coaxial electrical connector according to claim 1, wherein the first dielectric body is made of polytetrafluoroethylene and the second dielectric body is made of polyetherimide.

4. The coaxial electrical connector according to claim 2, wherein the first dielectric body is made of polytetrafluoroethylene and the second dielectric body is made of polyetherimide.

5. The coaxial electrical connector according to claim 1, wherein the metallic outer conductor comprises a plate-shaped base portion extending parallel to the circuit board and a cylindrical barrel portion extending upwardly from a top face of the base portion.

6. The coaxial electrical connector according to claim 5, wherein the base portion includes a bottom groove portion formed in a bottom thereof, the bottom groove portion extending in a transverse direction and having groove width dimensions larger than width dimensions of a signal pattern on the circuit board.

7. The coaxial electrical connector according to claim 1, wherein the first dielectric body has a first through-hole portion and the second dielectric body has a second through-hole portion, and wherein the first through-hole portion has a larger inside diameter than the second through-hole portion.

8. The coaxial electrical connector according to claim 1, wherein the metallic center conductor further comprises a connection portion provided in a top portion for connection to a counterpart center conductor and a contact portion provided in a bottom portion for contacting the circuit board, and wherein the abutment portion is formed in a top portion of the contact portion.

9. The coaxial electrical connector according to claim 1, wherein the first dielectric body comprises polytetrafluoroethylene and the second dielectric body comprises polyetherimide.

* * * * *